Aug. 23, 1960    C. O. SPENCER ET AL    2,949,901
INTERNAL COMBUSTION ENGINES
Filed Jan. 21, 1959    2 Sheets-Sheet 1
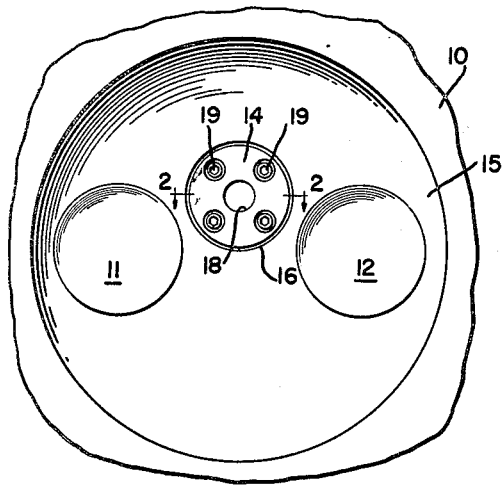
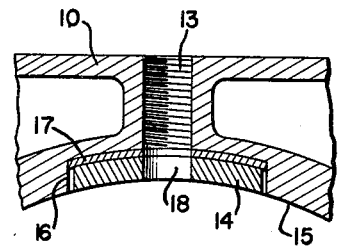
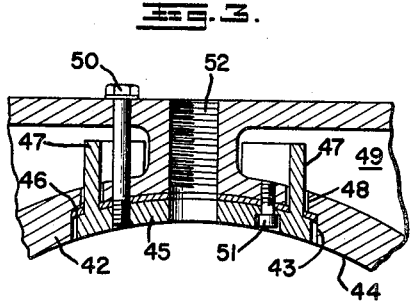
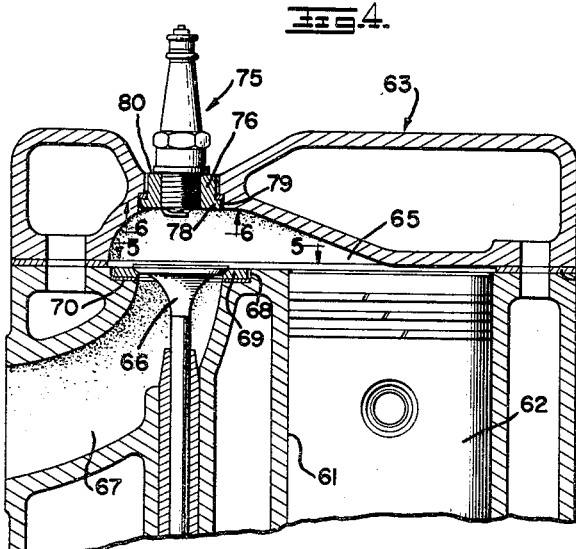
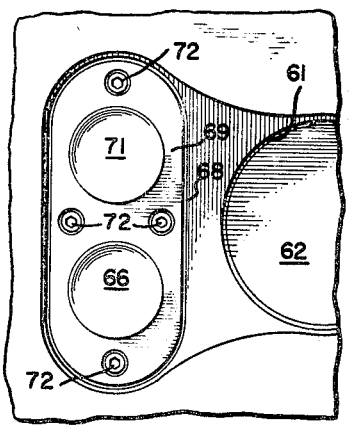
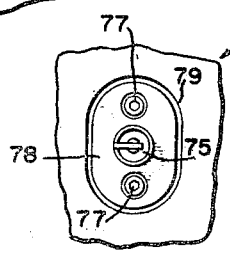
INVENTORS
CHARLES O. SPENCER
BOYD L. SPENCER
BY
ATTORNEY

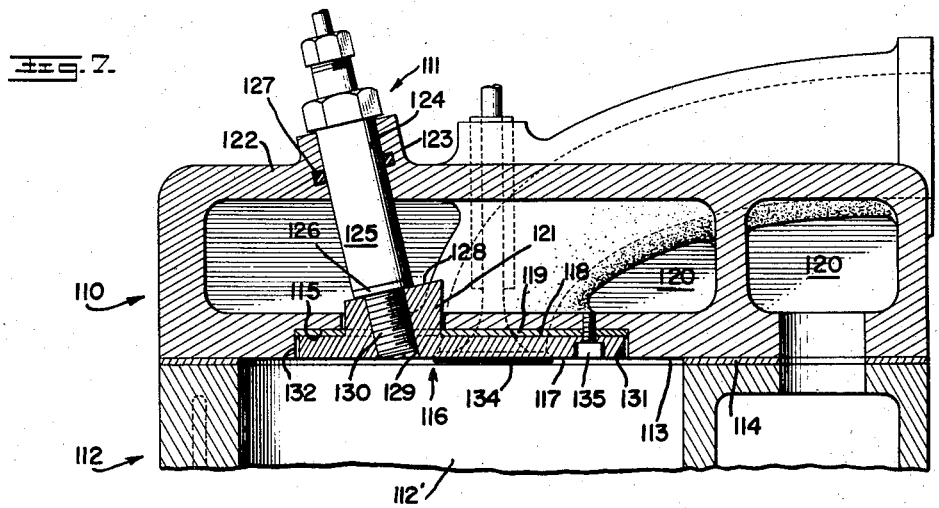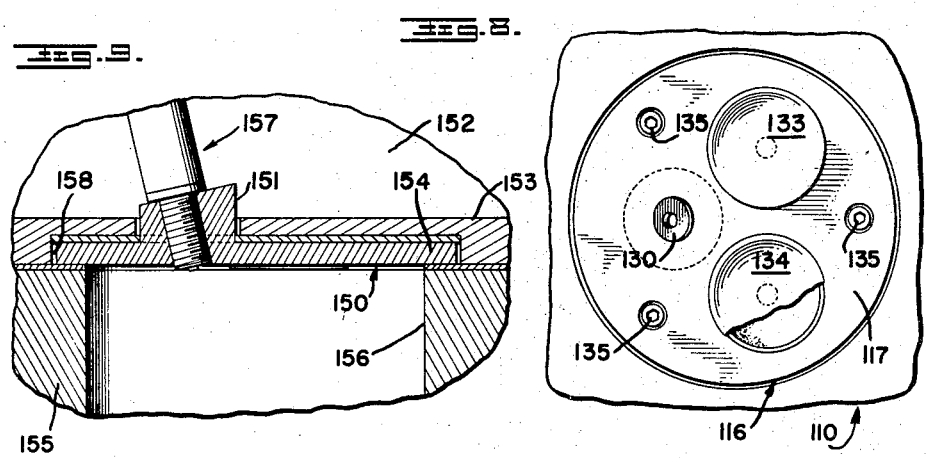
INVENTORS
CHARLES O. SPENCER
BOYD L. SPENCER

United States Patent Office 2,949,901
Patented Aug. 23, 1960

2,949,901
INTERNAL COMBUSTION ENGINES

Charles O. Spencer and Boyd L. Spencer, both of 440 S. Tyler St., Gladewater, Tex.

Filed Jan. 21, 1959, Ser. No. 788,210

9 Claims. (Cl. 123—41.82)

This invention relates to improvements in internal combustion engines and pertains more particularly to means for preventing undue thermal stresses and strains within the critical areas of the engine block and cylinder head assemblies.

This application is a continuation-in-part of application Serial No. 570,744, filed March 12, 1956, now abandoned.

The occurrence of cracks is not uncommon in cylinder heads and engine blocks of internal combustion engines, particularly cracks originating in the region of the valve seats. Even if such cracks are not of such depth as to extend into the water jacket, they are of serious nature as the leakage of hot gases at the valve will rapidly cause enlargement of the cracks in that region and the presence of a "hot spot" on the valve face resulting in a "burned" valve and subsequent loss of efficiency for that particularly cylinder. Also, cracks may originate at the edges of spark plugs or similar openings. These cracks are usually directly traceable to the presence of internal stresses in the cylinder head or block due to the differential in temperature between the surface of the combustion chamber and the outer surface of the cylinder head.

It is therefor a primary object of this invention to provide means for alleviating such stresses, at least in the most critical portion or portions of the combustion chamber.

Another object of this invention is to provide inserts for the combustion chambers of internal combustion engines which are capable of rapid heat transfer to relieve the engine of undue strains.

Still another object of this invention is to provide a combustion chamber insert for internal combustion engines which is formed from a grade of metal superior to that of the cylinder head itself and so placed within the cylinder head as to obviate local cracking or burning such as in the area of the valves and which insert is held in place by the fuel injection assembly for that particular cylinder.

A still further object of this invention is to provide a cylinder head insert for internal combustion engines, which insert is held in place by the conventional fuel injection nozzle and which insert may take the form of individual inserts for each cylinder or the form of Siamese or multiple inserts for adjacent cylinders.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Fig. 1 is a fragmentary plan view of an engine head and showing details of a combustion chamber having an insert therein;

Fig. 2 is an enlarged cross-sectional view taken along the plane of section line 2—2 in Fig. 1;

Fig. 3 is a cross-sectional view showing a modified form of insert;

Fig. 4 is a vertical section taken through an internal combustion engine of the valve-in-block type and illustrating modified forms of inserts;

Fig. 5 is a fragmentary plan view of the engine block shown in Fig. 4, as indicated by section line 5—5 in Fig. 4;

Fig. 6 is a fragmentary plan view as indicated by section line 6—6 in Fig. 4 and illustrating the spark plug insert;

Fig. 7 is a vertical sectional view through an internal combustion engine illustrating a further modification of the insert;

Fig. 8 is a fragmentary plan view of the cylinder head combustion surface shown in Fig. 7;

Fig. 9 is a view similar to Fig. 7 but illustrating a still further modified form of insert, and Fig. 10 is a plan view of a cylinder head showing a further modified form of insert.

Referring now to the drawings, specifically to Figs. 1 and 2, reference numeral 10 designates a portion of a cylinder head for an internal combustion engine while reference numerals 11 and 12 designate the intake and exhaust valves therefor. The threaded spark plug opening is indicated by reference numeral 13 and in this illustration, it is the area surrounding the plug opening that is the most critical. Therefor, an insert 14, according to this form of the invention, is removably mounted in the head 10 around the plug opening 13.

As is shown most clearly in Fig. 2, the combustion chamber dome 15, within the cylinder head 10, is counterbored as at 16 corresponding to the thickness of insert 14 and the compressed gasket 17. The insert is dished slightly, if necessary, to conform to the general shape of the combustion chamber and is provided with an opening 18 in register with the spark plug hole 13. The opening 18 may be internally threaded to receive the lower end of the spark plug or it may be a smooth bore in which a plug of smaller than standard reach is used.

The insert is held in place by a plurality of bolts 19, see Fig. 1, it being preferred that the inserts be countersunk to receive the heads of these bolts so that such bolt heads are flush with the exposed insert surface, in which case they may be of the Allen type. From Fig. 2, it will be noted that the diameter of the insert is slightly less than the diameter of the counter bore 16 within which it is received. This construction allows for relative expansion between the insert 14 and the head 10 to thus relieve the head of undue strain caused by abnormal temperature differentials. It is to be understood that the insert is to be used in the area of the combustion chamber in which the greatest temperature occurs, and wherein cracks are most likely to start. Cracks will normally occur between the spark plug opening and the valve seats, the insert of Fig. 1 being consequently located in this critical area.

In Fig. 3, the head 42 is counterbored as at 43 in its firing face or combustion chamber 44, which may be domed, concave or convex, in this case convex, and around the spark plug bore 52 to receive the insert 45 and its gasket 46, and the insert is provided with fins or ribs 47 which project through suitable openings 48, having necessary clearance in the head into the water jacket 49 within the head 42 to dissipate heat in the liquid coolant as rapidly as possible. Preferably, the insert is held in place by bolts 50 which extend completely through the head in the manner shown so that the portions of these bolts which are exposed to the coolant in the water jacket 49 will also aid in rapidly dissipating heat. Countersunk bolts 51 may also be used.

In Fig. 4, the engine type shown therein includes a block 60 having bores 61 within which pistons 62 are reciprocable. A cylinder head 63 and intervening gasket 64 are secured in place by conventional means, providing a combustion chamber 65 above the piston 62 and extending laterally to one side of the bore 61, as is common in Ricardo or modified Ricardo types. The valves, such as valve 66 and necessarily the passages 67 therefor are located in the block, the engine head being of the type commonly referred to as "L-head" or "side valve."

That portion of the block exposed within the combustion chamber 65 and within the region of the valves constitutes a critical area in this case, and this area is provided with a recess 68 within which an insert 69 is fitted, there being a gasket 70 interposed between the insert and the engine block. The insert covers the region of the valves 66 and 71 and the seats for these valves are formed directly in the insert 69, as can be clearly seen in Fig. 4.

Bolts 72 are provided for securing the insert 69 in place, their heads being preferably recessed within the insert so as to be flush with the exposed surface thereof. The insert itself is of slightly smaller dimension peripherally than the block recess within which it is fitted and is held in place by bolts 72, there being a small amount of clearance provided thereby to permit expansion of the insert without imparting undue stress to the engine block.

As the area surrounding the spark plug opening is also critical, it will be seen in Figs. 4 and 6 that the spark plug 75 may be mounted in an insert 76, secured to the head 63 by bolts 77, said insert having an enlarged or flanged portion 78 fitted within a recess 79 in the head. The upper portion 80 of the insert having necessary clearance, preferably projects through the head for cooling purposes and also to take advantage of the better grade of material used therein, if such be the case, in which to form the threads receiving the spark plug 75.

Another modification of the invention is shown in Fig. 7, in association with the cylinder head 110 of an internal combustion engine of the type utilizing a fuel injection nozzle 111, and mounted on a cylinder block 112 having a cylinder bore 112' therein. It is quite common for the cylinder heads of engines such as shown in Fig. 7 to be of the "plank" type. That is, the cylinder head does not have a recess or pocket therein forming the combustion chamber but, rather, the combustion chamber is formed above the crown of the piston at top dead center bounded by the flat face of the cylinder head and the surrounding cylinder bore wall portions. That is to say, the exposed surface portion 113 of the cylinder head within the cylinder bore 112' is a planar continuation of that surface 114 thereof which is contiguous with the cylinder block 112.

According to the present invention, the exposed cylinder head portion 113 is provided with a recess 115 within which the insert 116 is fitted, the insert having a lower face 117 exposed to the products of combustion and this face of the insert is flat, as shown. The upper face 118 of the insert is likewise flat in the major portion thereof and fits within the recess 115 and is provided with an intermediate gasket 119 between the insert and cylinder head, as desired.

The cylinder head 110 includes a water jacket 120 and the insert 116 is provided with a boss 121, with necessary clearance, projecting thereinto, as shown. The upper wall 122 of the cylinder head 110 is provided with an angled boss 123 having a concentric bore 124 therethrough freely receiving the body 125 of the fuel injection unit 111, the stem 130 of the unit 111 being of reduced diameter as compared with the main body 125 and there being a gasket 126 between the main body and the upper face 128 of the boss 121. The body 125 of the injector unit is sealed within the bore 124 by a grommet 127 nested within the wall 122 and boss 123.

The insert boss 121, with necessary clearance, is cylindrical and has its upper face 128 slanted so as to be at right angles to the axis of the injector unit 111. The boss 121 is provided with a bore 129 threaded so as to receive the externally threaded stem 130 of the injector unit 111. In this manner, the injector assembly 111, by virtue of its screw threaded engagement with the insert, is instrumental in holding the insert in place. However, bolts 135 are preferably used in addition so that the insert is assured of firm anchorage within the cylinder head. The boss 121, in addition to the function of providing an anchoring means for the fuel injection unit, also serves as a means for dissipating heat generated in the combustion chamber directly to the coolant inasmuch as the boss projects into the water jacket and has a substantial surface area thereof directly in contact with the coolant.

Clearance is provided between the peripheral edge 131 of the insert and the surrounding wall 132 of the head recess 115. Further, the insert itself may be provided with openings if the engine is of the type having conventional valves such as indicated by reference characters 133 and 134. Of course, with engines having both intake and exhaust porting within the cylinder bore, no such openings will be provided but, at any rate, when used, the openings permit the valve seats to be formed directly in the better quality metal of the insert itself rather than in the cylinder head 110.

In Fig. 9, the insert 150, like the insert of Figs. 7 and 8, is of circular form and includes the boss 151, with necessary clearance, projecting into the water jacket 152 of cylinder head 153. However, in this form, the critical area extends over the entire area of the cylinder bore 156 and the peripheral edge portion 154 of the insert 150 overlaps that portion of the cylinder block 155 surrounding the cylinder bore 156. Thus, the insert 150 is not only held in place by the injector unit 157 but also by virtue of the fact that the insert is sandwiched between the cylinder block 155 and head 153. Thus, additional securing bolts are not necessary or for that matter, even desirable, since the insert may then more easily and uniformly expand within the confines of the peripheral clearance space 158 provided for that purpose.

The modification illustrated in Fig. 10 embodies a "Siamese" insert 160 disposed within a suitable recess 161 in a cylinder head 162. In this case, the critical area extends over, and the insert covers two adjacent exposed combustion chamber surfaces 163 and 164 joined by intermediate portion 165 overlying that portion of the associated cylinder block between such cylinders. The intermediate region of the insert is provided with water jacketing openings 166 and 167 mating with the conventional communicating passages in the block and head. The insert 160 may overlap the cylinder block as in the case of Fig. 9 or may be confined wholly within the combustion chamber as in Figs. 7 and 8. Due to the large area of such insert, it may be desirable to use securing bolts 168 and, of course, valve openings 169 are to be provided where necessary.

In all forms of the invention, the insert covers the critical area of the firing surface and is a few thousandths smaller in diameter than the countersunk area so that it is free to expand and contract independently of the head or block. Consequently, abnormal stresses tending to cause cracks in the head or block will not occur therein. Should the inserts become damaged, they can be readily replaced at little expense.

Although certain specific embodiments of the invention have been shown and described, it is obvious that many modifications thereof are possible. For example, while the invention is shown and described in connection with engines wherein the valves are in the head, obvious- That which is claimed, is:

1. In an internal combustion engine, an engine body including at least one combustion chamber having a firing surface with a critical area subject to thermal stresses, said firing surface having a counterbore in the critical area thereof, an insert for said combustion chamber nested in said counterbore and covering at least a portion of the critical area of said firing surface, the lateral dimensions of said insert being slightly smaller than those of said counterbore with the peripheral edge of said insert spaced from the peripheral wall of the counterbore and providing an expansion area for said insert to accommodate heat and strain absorption independently of said body, a gasket disposed only between the rear surface of said insert and the bottom wall of said counterbore, means securing the insert and body together, the combined thicknesses of said insert and gasket being substantially equal to the depth of said counterbore with the exposed surface of said insert generally contiguous with and conforming to the surface surrounding said counterbore, said engine body being provided with a water jacket substantially entirely surrounding said combustion chamber and having an opening between said water jacket and said counterbore, and heat transfer means extending from said insert through said opening and exposed to said water jacket, the aforementioned lateral dimensions of the insert being slightly smaller than those of the counterbore at the time of initial assembly.

2. The assembly as defined in claim 1 wherein said heat transfer means comprises at least one bolt securing said insert to said body.

3. The assembly as defined in claim 2 wherein said bolt extends completely through said body.

4. The assembly as defined in claim 1 wherein said heat transfer means comprises fin means on said insert.

5. The assembly as defined in claim 1 wherein said heat transfer means comprises a boss having a threaded bore therethrough, and a fuel injector unit engaged in said boss.

6. In an internal combustion engine, an engine body having a combustion chamber provided with a firing surface with a critical area thereof subject to thermal stresses, said firing surface having a counterbore in the critical area thereof, an insert for said combustion chamber nested in said counterbore and being of a size to substantially completely fill such counterbore, the lateral dimensions of the insert being slightly smaller than those of the counterbore at the time of initial assembly to permit relative expansion between the insert and the engine body without effecting interference therebetween, and means securing the insert and body together and effective to provide heat transfer characteristics between the insert and body substantially greater than that which would be achieved without the presence of such means, said engine body being provided with water jacketing, said means including a threaded member extending into the engine body in a region thereof immediately adjacent the water jacket and constituting the sole means attaching said insert to the engine body whereby said insert is readily removable from the engine body.

7. The assembly as defined by claim 6 wherein said threaded member projects into the water jacket so as to expose a substantial surface area thereof to cool it within the jacket.

8. The assembly as defined by claim 6 wherein said insert is provided with a threaded boss projecting into said water jacket, said means including a fuel injection unit engaged in said boss.

9. The assembly as defined in claim 6 wherein said threaded member comprises a bolt.

References Cited in the file of this patent

UNITED STATES PATENTS

| | | |
|---|---|---|
| 1,770,237 | Kondo | July 8, 1930 |
| 2,191,485 | Jensen | Feb. 27, 1940 |
| 2,240,202 | Anselmi | Apr. 29, 1941 |
| 2,631,577 | Carter | Mar. 17, 1953 |
| 2,716,969 | Lang | Sept. 6, 1955 |

FOREIGN PATENTS

| | | |
|---|---|---|
| 429,727 | Italy | Oct. 26, 1946 |
| 477,267 | Italy | Mar. 9, 1951 |